US008224390B2

(12) United States Patent
Alberth, Jr. et al.

(10) Patent No.: US 8,224,390 B2
(45) Date of Patent: Jul. 17, 2012

(54) METHODS AND DEVICES OF A COMMUNICATION DEVICE AND A DIGITAL PICTURE FRAME

(75) Inventors: William Alberth, Jr., Prairie Grove, IL (US); Anita Denise Fries, Lake Villa, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 611 days.

(21) Appl. No.: 12/142,811

(22) Filed: Jun. 20, 2008

(65) Prior Publication Data

US 2009/0318194 A1    Dec. 24, 2009

(51) Int. Cl.
*H04B 1/38*    (2006.01)
(52) U.S. Cl. ............... 455/566; 455/414.1; 379/216.01; 718/1; 709/206
(58) Field of Classification Search .............. 455/566; 379/216.01, 355.01, 368; 709/206; 704/235
See application file for complete search history.

(56) References Cited

U.S. PATENT DOCUMENTS

| 6,266,069 | B1 | 7/2001 | Thagard et al. |
| 7,433,649 | B2 | 10/2008 | Toulis et al. |
| 7,689,232 | B1 * | 3/2010 | Beyer, Jr. ..................... 455/457 |
| 2002/0126150 | A1 | 9/2002 | Parry |
| 2004/0184596 | A1 * | 9/2004 | Choi ........................ 379/355.01 |
| 2006/0170669 | A1 * | 8/2006 | Walker et al. ................. 345/418 |
| 2006/0240862 | A1 | 10/2006 | Neven et al. |
| 2006/0293069 | A1 | 12/2006 | Patel et al. |
| 2008/0040716 | A1 * | 2/2008 | Lam et al. ......................... 718/1 |
| 2008/0152263 | A1 * | 6/2008 | Harrison ......................... 382/313 |
| 2009/0271486 | A1 * | 10/2009 | Ligh et al. ...................... 709/206 |
| 2010/0029253 | A1 * | 2/2010 | Han et al. ...................... 455/414.2 |
| 2010/0211575 | A1 * | 8/2010 | Collins et al. .................. 707/749 |
| 2010/0302027 | A1 * | 12/2010 | Gold ........................... 340/539.2 |

FOREIGN PATENT DOCUMENTS

| JP | 2000-049913 A | 2/2000 |
| JP | 2000244673 | 9/2000 |
| KR | 10-2005-0082196 A | 8/2005 |
| KR | 10-2007-0065752 A | 6/2007 |

OTHER PUBLICATIONS

Patent Cooperation Treaty, "PCT Search Report and Written Opinion of the International Searching Authority" for International Application No. PCT/US2009/045569 Jan. 27, 2010, 11 pages.

* cited by examiner

*Primary Examiner* — Kamran Afshar
*Assistant Examiner* — Khawar Iqbal

(57) ABSTRACT

Disclosed are devices and methods of a mobile communication device including receiving data related to an image exhibited on a display device of a digital frame and processing the received data to access at least one communication initiation address. The communication device and the digital frame may establish communication in any number of manners. For example, the communication device may be in the proximity of the digital frame or may touch the frame itself, for example on a touch screen of the digital frame. In any event, the digital frame may include a transceiver to transmit data to the communication device so that at least in part based on data of the digital frame the communication device may automatically or semi-automatically initiate a communication to a communication address associated with the data. Accordingly, a user's desire to place a call telephone based on viewing a photo may be simply initiated.

18 Claims, 3 Drawing Sheets

METHODS AND DEVICES OF A COMMUNICATION DEVICE AND A DIGITAL PICTURE FRAME

FIELD

Disclose are methods and devices of a communication device and digital picture frame, and more particularly, a communication device and a digital picture frame configured so that the communication device may initiate a telephone call or other type of communication to a subject of an image displayed on the digital picture frame based on data the communication device receives that is transmitted from the digital picture frame.

BACKGROUND

Digital picture or photo frames are becoming increasingly popular. A digital photo frame is a device about the size and shape of an ordinary picture frame. A digital photo frame includes an LCD screen, which can display multiple photos in a slideshow format and/or a plurality of photos simultaneously. The timing of a photo slide show may be automatic or may be manually activated.

Manufacturers make different data storage options available. Some frames may have internal memory. Other frames offer memory card slots, typically for SD cards with others allowing MMC, XD, CompactFlash and Memory Sticks too. Therefore, with a 2 GB card, a frame exhibit up to 1,000 of high resolution images.

Different wireless options are available as well. Some frames utilize a USB Bluetooth dongle that acts as a transceiver from a laptop or PC to the frame. Others support WIFI. Accordingly, it may also be possible to send a photo to the frame from anywhere in the world over the Internet. Certain frames makes use of WINDOWS XP and VISTA 'slideshow' technology which stream content to the screen, for example, in addition to photos, RSS feeds (e.g. news stories/share prices) from the Internet.

Digital picture frames are enjoyed by many types of people. For example, a grandparent may enjoy their digital photo frame as it cycles through a slideshow of photos of their children, grand children, great grand children, other extended family members as well as their friends. Viewing photos of loved ones may motivate a person to place a telephone call to one or more subjects of the photos. Particularly for those of a grandparent's age, navigating a menu of a telephone book stored on a telephone or mobile communication device may be somewhat difficult due to the size of the font and the manual dexterity required. Even reaching for a written telephone book to manually enter a telephone number into the keypad of a telephone may deter a person from making a telephone call to a loved one that they may otherwise wish to make.

DETAILED DESCRIPTIONS

Figure 1:
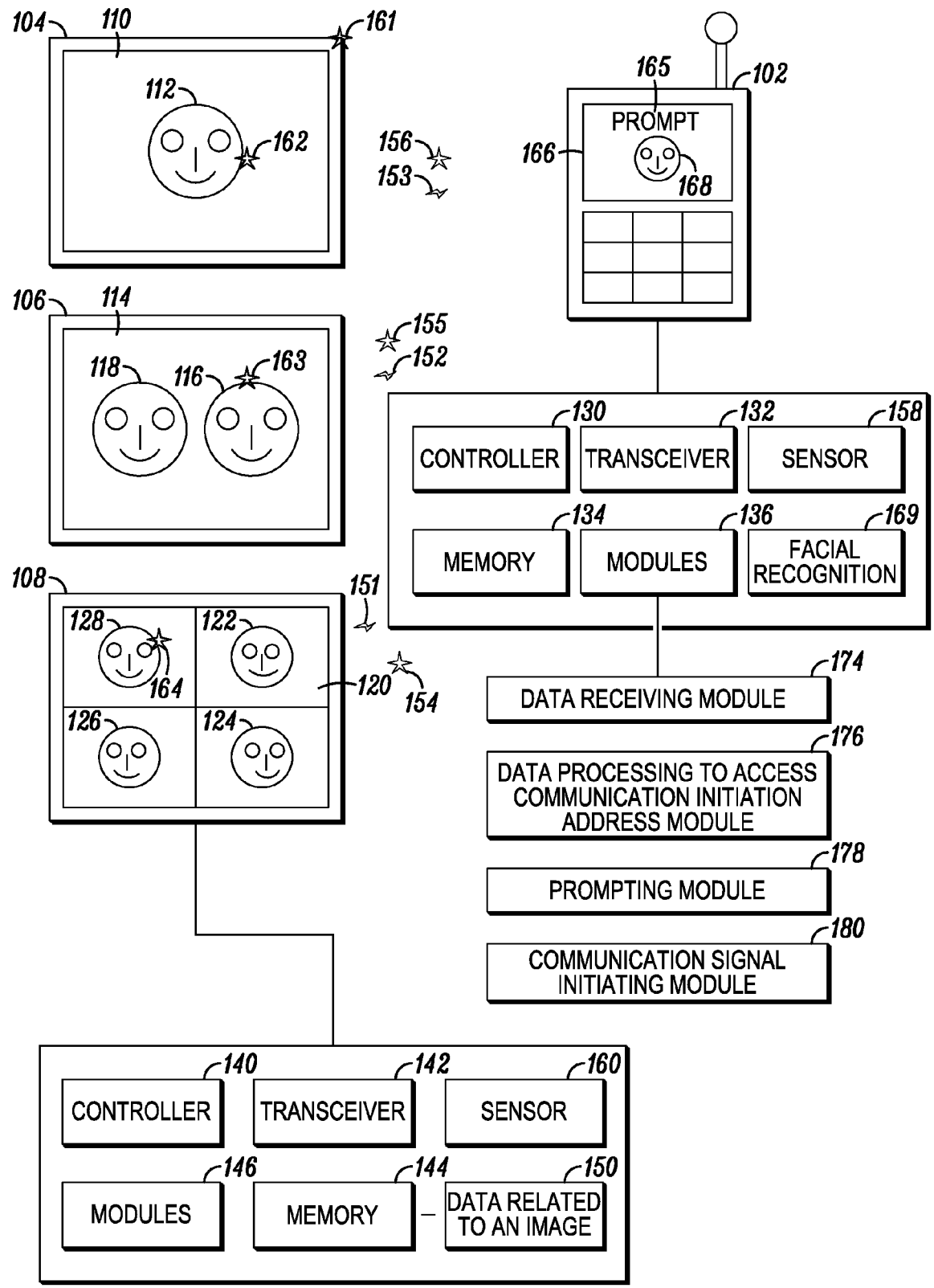
FIG. 1 depicts a communication device and three different digital frame possibilities, one frame showing a single subject of an image, another showing two subjects of a single image, and another showing a plurality of separate images together on the frame.

It would be beneficial if a telephone device, such as a mobile communication device were configured to receive and process data correlated to an image exhibited on the display from a digital photo frame, and automatically place a call based on the data. In this way, a user may be able to place a call on the telephone device without navigating a menu, or otherwise looking up a telephone number and/or manually entering the telephone number. Accordingly, a user's desire to place a call based on viewing a photo may be simply initiated.

Disclosed are devices and methods of a mobile communication device including receiving data related to an image exhibited on a display device of a digital frame and processing the received data to access at least one communication initiation address. The communication device and a frame device may initiate communication in any number of manners so that data related to an exhibited image may be transmitted from the frame to the mobile communication device. For example, to establish communication, one or both devices may sense their proximity. Alternatively, to establish communication, the communication device may touch the frame. In any event, the digital frame may include a transceiver to transmit data related to an exhibited image to the communication device so that at least in part based on data of the digital frame the communication device may automatically or semi-automatically initiate a communication to a communication address associated with the data. In this way, a user may be able to place a call on the communication device without navigating a menu, or otherwise looking up a telephone number and/or manually entering the telephone number, simply by either making contact with the digital frame or by having a particular proximity to the digital frame.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts a communication device and three different digital frame possibilities, one frame showing a single subject of an image, another showing two subjects of a single image, and another showing a plurality of separate images together on the frame. The images, for example, may be photographs. The communication device 102 is depicted as a mobile communication device but of course can be any type of communication device. The communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The mobile communication device is depicted as configured to be in communication with one or more of the three different digital frame possibilities, one frame showing a single subject image 104, another showing two subjects in one image 106, and another showing a plurality of separate images together on the frame 108. The digital frames 104, 106 and 108 are depicted to be about the size and shape of an ordinary picture frame, but of course may be of any size or dimension. A digital photo frame, for example, frame 104 may include an LCD screen or any other display device 110, which can display any arrangement of images including one or more images 112. For example, frame 104 may exhibit, multiple images such as photographs in a slideshow format.

The communication device 102 may include components such as a controller 130, one or more transceiver 132, for example a short range transceiver such a Bluetooth transceiver, a radio frequency identification tag (RFID) and/or a long range cellular transceiver, a memory 134 and modules 136. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. The modules may include for example, a data receiving module 174, a data processing to access communication initiation module 176, a prompting module 178 and/or a communication signal initiation module 180.

A frame, for example, frame 108 may similarly include components such as a controller 140, one or more transceiver 142, for example a short range transceiver such a Bluetooth transceiver, an RFID and/or a long range cellular transceiver, a memory 144 and modules 146. It is understood that depending upon the type of frame 108, the memory of the frame 114 may be of any suitable configuration. For example, some frames may have internal memory. Other frames offer memory card slots, typically for SD cards with others allowing MMC, XD, CompactFlash and Memory Sticks too. Therefore, with a 2 GB card, a frame exhibit up to 1,000 of high resolution images. The memory 144 of the frame 108 may include instruction modules, as well as data that may be pertinent to one or more of the images 122, 124, 126 and/or 128 which may be exhibited on the display device 120 of frame 108.

The data that may be stored in a memory, such as memory 144, as mentioned may include information pertinent to the images of the device. For example, image 128 may be of a person, known as Michael and who has a communication address such as a telephone number. Data 150 related to an image may be stored in memory 144 of the frame 108. Other information, such as birthday, children's names, parent's names, wife's name, residential address, work telephone number, email address, one or more pertinent website address, favorite music, clothing size, favorite colors, calendar of other dates and/or schedules, and/or wish list for presents may also be stored in memory 144. The data 150 may include meta data pertaining to the image data stored in the device. As mentioned, frame 108 may be WiFi and/or Internet enabled, so that the information stored in the memory may be updated upon manual initiation, or automatically. Moreover, images may be downloaded onto the frame in any suitable manner, for example, via the communication device 102 along with any data 150 related to the image 122.

In addition to data being stored in the frame's 108 memory 144, or alternatively, data related to the image of the frame may be stored in the memory 134 of the communication device 102. Moreover, the communication device 102 may be configured to transmit data to the frame 108. The lightning bolt 151 depicts transmission of the discussed data related to an image between frame 108 and communication device 102, for example image 128. The lightening bolt 152 depicts transmission of the discussed data related to an image between frame 106 and communication device 102, for example image 116. The lightening bolt 153 depicts transmission of the discussed data related to an image between frame 104 and communication device 102, for example image 112.

To initiate transmission of data 150 between a frame, for example frame 108 and the communication device 102, in one embodiment, the devices may make contact. In another embodiment, their proximity may be sensed. For example, the communication device 102 may include for example, a sensor 158, such as a proximity sensor to sense when it is within a particular range of a frame, such as frame 104, 106 and/or 108. The frame 104 may for example, include a transceiver 142 to transmit a signal that may be sensed by a sensor 158 of the communication device 102. Additionally or alternatively, the frame 108 may include a sensor 160. The star 154 is used in the figure to depict that the either one of the devices, communication device 102 and/or frame 108 may sense the proximity of the other device with a sensor 158 and/or a sensor 160 so that their communication may be initiated. Similarly, star 155 is used in the figure to depict that either one of the devices, communication device 102 and/or frame 106 may sense the proximity of the other device. Similarly, star 156 is used in the figure to depict that either one of the devices, communication device 102 and/or frame 104 may sense the proximity of the other device. It is understood that any manner in which to sense proximity is within the scope of this discussion. Moreover, user manual input to either device to initiate communication between the devices is within the scope of this discussion.

Touching of a frame may be sensed by sensor 160 of the frame 108 and/or by sensor 158 of the communication device. In one embodiment, communication between the devices, for example, communication device 102 and frames 104, 106 and/or 108, may be initiated by mobile communication device 102 touching anywhere on the frame 104 while the display device 110 of the frame 104 exhibits the image 112 thereon or within a predetermined period of time before or after the touch. A touch on frame 104 is indicated by touch star 161. While the touch star 161 is depicted on the perimeter region of the frame, it is understood that a touch may be anywhere on the frame or other device or apparatus of the frame.

A touch on the display screen 110 on frame 104 is indicated by star 162. In another embodiment, communication between communication device 102 and frames 104, 106 and/or 108 may be initiated by the communication device 102 touching the display device 110 of the frame 104 while the display device 110 of the frame 104 exhibits the image 112 thereon or within a predetermined period of time before or after the touch. The display device 110, for example, may be a touch screen of any type. In an embodiment, more than one subject may be exhibited as part of the same image such as that shown on display device 114 of frame 106. By touching the subject 116 of an image having multiple subjects such as that shown on display device 114 of frame 106 as indicated by star 163, communication between the devices may be established. As another example, frame 108 depicts separate multiple images 122, 124, 126 and 128. Touch star 164 indicates that the communication device 102 may touch an image, such as image 128 to initiate or establish communication between communication device 128 and frame 108. It is understood that the communication device 102 may touch an image of a display device of a frame, and/or any type of apparatus may make contact. For example, a stylus of the type used with a PDA may make contact. On the other hand, a user's finger may make contact with the display device of a frame so that communication between a frame and a communication device is initiated or established. In any event, by making such contact in any suitable manner, or by being within a particular proximity of a frame while an image is exhibited or within a predetermine time of the image being exhibited, a communication between the frame and the communication device may be established. Moreover, communication may be initiated by user input, for example, by the user activating a soft key on either device.

As discussed above, data that may be stored in a memory of a frame, for example frame 108, such as memory 144, and may include information pertinent to the images of the device. Image 128 includes in this example a touch start 164 indicating that the image may have been touched. The image 128 may be of a person, for example, known as Michael who has a communication address such as a telephone number. Image data 150 including any type of data related to an image may be stored in memory 144. The digital frame 108 may include a transceiver 142 to transmit data 150 to the communication device 102 so that based on the data of the digital frame, the communication device may automatically or semi-automatically initiate a communication to a communication address in accordance with the data 150. In this way, a user may be able to place a telephone call on the communication device 102 without navigating a menu, or otherwise looking up a telephone number and/or manually entering the telephone number. Accordingly, a user's desire to place a call based on viewing a photo may be simply initiated.

As discussed, any manner in which to initiate communication between the communication device 102 and a frame, for example, on or more of frames 104, 106 and/or 108, is within the scope of this discussion. Also, as mentioned the mobile communication device 102 may include a controller 130 configured to execute instructions and a transceiver 132 in communication with the controller 130. The mobile communication device may further include an data receiving module 174 configured to receive data 150 related to an image, for example, image 128 exhibited on a display device 120 of a digital frame, for example, frame 108. As discussed above, the data 150 may include different information. The data for example, may be meta data that pertains to the image data stored in the device such as names, location and date of the image, phone number of the individual, equipment used to create the image, comments from the photographer, or other data relevant to the image data. In another embodiment, the data may be enough so that the mobile communication device accesses its own memory 134 to retrieve data related to the image 128. For example, the data 150 may include the name of the person in the image. When the name is communicated to device 102, it can be used to index a phone number in the address book stored in memory 134. It is further understood that the data 150 may include any type of information.

The communication device 102 may further include an image data processing module 176 configured to process received data 150 so as to access at least one communication initiation address such as a telephone number, URL, or email address. As mentioned the communication address may be delivered from the frame 108. Alternatively, the communication address may be stored in memory 134 of the communication device 102, or may be retrieved in any suitable manner, such as by access to the Internet via the communication device 102. Data 150 related to an exhibited image transmitted from the frame 108 may therefore cause the communication device 102 to access a communication initiation address in any suitable manner.

A prompting module 178 may be configured to generate a prompt 165 that may be annunciated to a user, for example, upon the display screen 166 of the communication device 102 to determine whether to transmit a communication signal pursuant to a communication initiation address. It is understood that a prompt to the user may be provided in any form, such as a display screen prompt or an audio prompt. Moreover, a response to the prompt may of course be made in any suitable manner. In any event, a communication signal in accordance with a communication address, such as a telephone number, may be initiated in response to a prompt, automatically or semi-automatically. That is, in accordance with a communication signal initiating module 180 configured to initiate a communication signal subsequent to access a communication initiation address. In this way, mobile communication device 102 may be configured to receive and process data 150 from a digital photo frame such as frame 108 that is correlated to an image 128 exhibited on the display 120, and automatically or in accordance with a prompt, place a call based on the data 150. In this way, a user may be able to place a call on the telephone device without navigating a menu, or otherwise looking up a telephone number and/or manually entering the telephone number. Accordingly, a user's desire to place a call based on viewing a photo may be simply initiated.

A subject of an image may have a plurality of communication initiation addresses, such as a plurality of telephone numbers, one or more email addresses, and/or a website address. Where an image includes more than one subject as depicted on frame display 114 of frame 106, that includes two subjects, a prompt may inquire which of the subjects the user may wish to contact. Moreover, a prompt may include a plurality of communication initiation addresses for one or more subjects.

In accordance with the prompt 165 in another embodiment, an image 168 including the subject 128 may be displayed on the display device 166. In this example, the image 168 is the same as the image 128. The data for the image 168 may be accessed by the mobile communication 102 in any suitable manner. For example, the data for the image 168 on the display device 166 of the communication device 102 may be transmitted with the data related to the image 150 from the frame 108. Alternatively, the data for the image 168 may be stored in memory 134 of the communication device 102, or it may otherwise be retrieved, for example from the Internet. Alternatively, a different image 168 than the image 128 may be exhibited on the display device 166 of the mobile communication device. In this way, there may be a confirmation for the user of the intended call recipient, for example, in accordance with the prompt 165, prior to initiation of a communication address signal.

Figure 2:
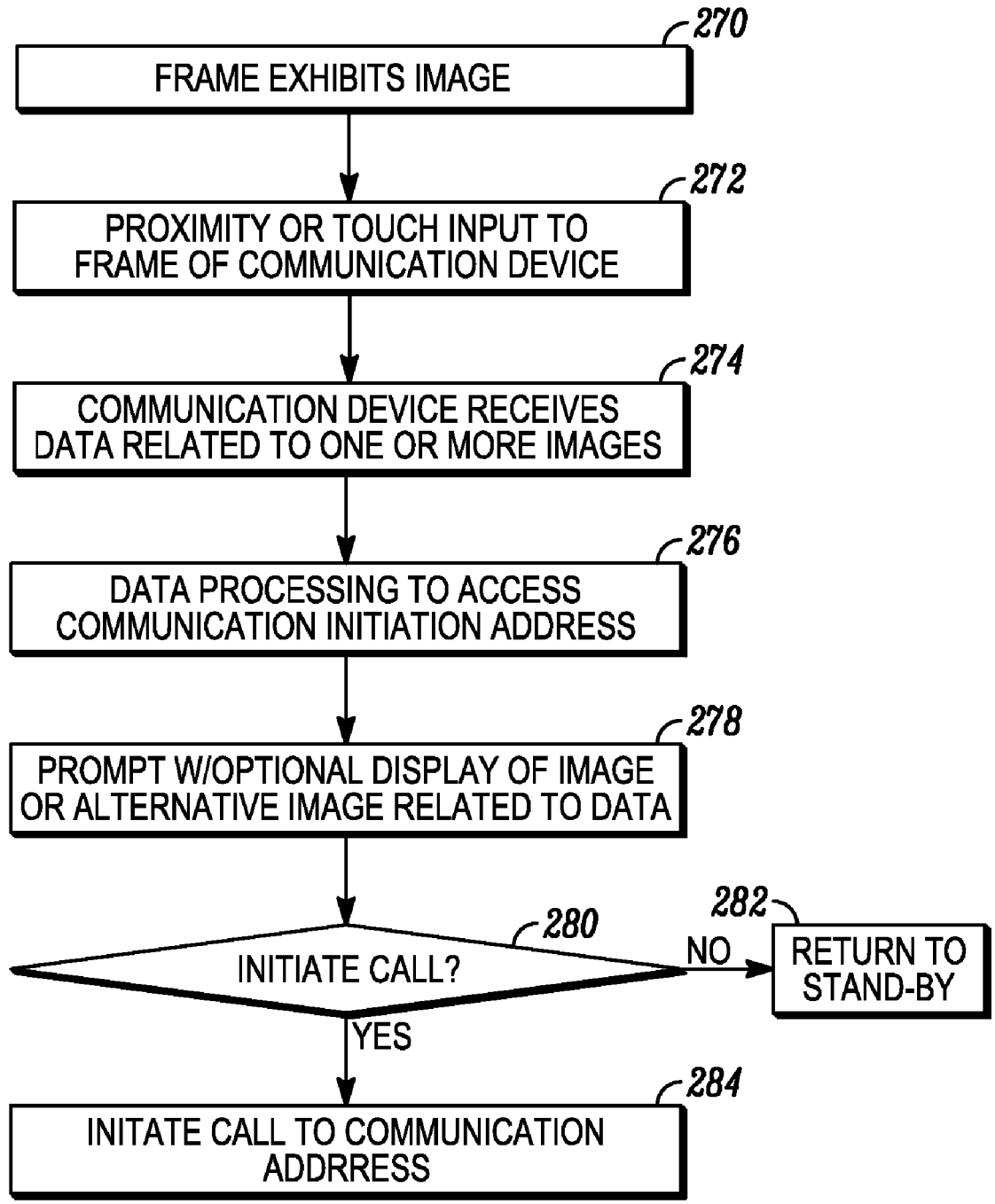
FIG. 2 is a flowchart of an embodiment of a method of a communication device and a digital frame.

FIG. 2 is a flowchart of an embodiment of a method of a communication device and a digital frame. As discussed in detail above, a frame 104 (see FIG. 1) may exhibit 270 an image. Proximity or touch input 272 between the communication device 102 and a frame 104 may automatically initiate communication between the communication device 102 and the frame 104. Alternatively, user input may manually, semi-manually or semi-automatically initiate communication between the communication device 102 and the frame 104. For example, there may be a soft key on either the mobile communication device or the frame that initiates the communication between them. The initial communication may be a handshake. Alternatively, the initial communication between devices may be a transmission of data related to an image 150 displayed on the frame 104 so that the communication device receives 274 data relating to one or more subjects of images, or images. In one embodiment, the data may be visual data that may be processed by a facial recognition algorithm 169. In this way, the communication device 102 may match a face exhibited on an image with those stored in the address book of the communication device 102. In any event, as discussed above, the data related to the image 150 may be processed to access 276 a communication initiation address, such as a telephone number. A prompt 278 may occur at any time in the process. The image 128 may be displayed on the display device 166 of the communication device 102. The data 150 may include image data. Alternatively, another image, for example of the same subject may be displayed on the display device 166. The data 150 may include such an ancillary image or the ancillary image may be stored in the memory 134 of the communication device 102 or obtained in any other suitable manner. The prompt may inquire whether to initiate a call 280. A no response may include an explicit no response or may include allowing a predetermined amount of time to pass without a response. In such a case, the communication device may return to stand-by 282. Alternatively, a positive response may initiate 284 the call to the communication address such as a telephone number. In this way, a user may be able to place a call on the communication device without navigating a menu, or otherwise looking up a telephone number and/or manually entering the telephone number.

Figure 3:
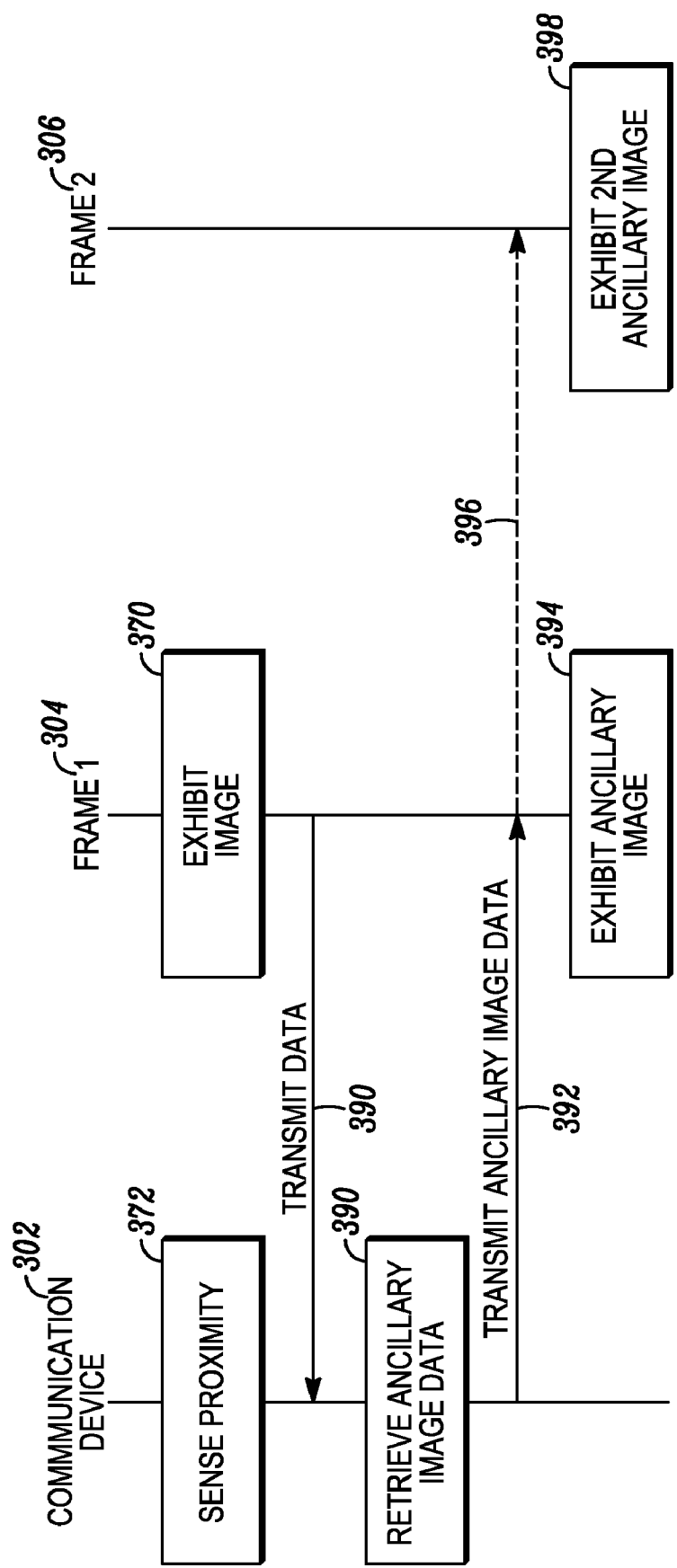
FIG. 3 is a signal flow diagram to describe interactions between a mobile communication device and in one embodiment, more than one frame, in transmitting and receiving ancillary image data.

FIG. 3 is a signal flow diagram to describe interactions between a mobile communication device 302 and in one embodiment, more than one frame, frame 304 and frame 306 in transmitting and receiving ancillary image data. As discussed above, frame 304 may exhibit an image 370. One or the other of the devices may sense proximity 372 of the other devices. The frame 304 may transmit 390 data 150 (see FIG. 1) to the communication device 302. There may be stored in the memory 134 of the communication device 302 ancillary image data, or the ancillary image data may be retrieved in some other suitable manner, such as via the Internet. The ancillary image data may therefore be retrieved 390 and transmitted 392 to frame 304. Frame 304 may therefore exhibit an ancillary image 394. The same or different ancillary image data may be transmitted 396 either simultaneously or sequentially to frame 306. Frame 306 may exhibit 398 an ancillary image. The received ancillary images by the frames 304 and 306 may be stored in the memory of those devices. Data such as data 150 may be transmitted to either frames 304 and/or 306 as well so that the upon exhibiting the ancillary image on the display device of either of the frames 304 and/or 306, data 150 may be available to be transmitted to a communication device 102 or another communication device in accordance with the manner described above in detail.

While a user is engaged in communication with a subject of an image exhibited on a frame, for example, frame 104, the frame may display a plurality of images including the subject, either sequentially as in a slide show, or simultaneously in the manner shown on frame 108. Moreover, a plurality of frames may exhibit images of including the subject of the communication. During the period of time that the user is engage in communication with the subject, the communication device and a frame may be in continued communication transmitting data related to the image originally exhibited by the frame. As mentioned, data related to an image, and more particularly, to a subject of an image may be retrieved in any suitable manner so that it may be displayed on the frame or on the display device of the communication device. When the communication between the user and the subject end, the frame or frames may time out and revert back to content stored before the communication.

Disclosed are devices and methods of a mobile communication device including receiving data related to an image exhibited on a display device of a digital frame and processing the received data to access at least one communication initiation address such as telephone number. The communication device and the digital frame may establish communication in any number of manners. For example, the communication device may be in the proximity of the digital frame. In another embodiment, the communication device may touch the frame itself, on its border, or on a touch screen of the digital device display. In any event, the digital frame may include a transceiver to transmit data to the communication device so that at least in part based on data of the digital frame the communication device may automatically or semi-automatically initiate a communication to a communication address associated with the data. In this way, a user may be able to place a call on the telephone device without navigating a menu, or otherwise looking up a telephone number and/or manually entering the telephone number. Accordingly, a user's desire to place a telephone call based on viewing a photo may be simply initiated.

The disclosed methods involve pictures and slideshows. The methods disclosed may also be applied to video images.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of a mobile communication device, the mobile communication device being a first device, comprising:
exhibiting an image on a display device of a digital frame, the display device configured to display multiple images including at least one of a photograph, a photograph in a slideshow format and a video format;
initiating a communication between the digital frame and the first device by a user, substantially while exhibiting the image on the display device;
receiving data related to the image exhibited on the display device in response to the user initiating communication; and
processing received data to access at least one communication initiation address;
wherein receiving data from the digital frame device is in response to at least one of the mobile communication device touching the digital frame device while the display device exhibits the image thereon or to the mobile communication device touching the display device of the digital frame device while the display device exhibits the image thereon.

2. The method of claim 1, further comprising:
initiating a communication signal subsequent to access of the at least one communication initiation address.

3. The method of claim 1,
prompting to determine whether to initiate a communication signal pursuant to the communication initiation address.

4. The method of claim 1, wherein receiving data from the digital frame device is in response to user input received by the mobile communication device while the display device exhibits the image thereon.

5. The method of claim 1, wherein the mobile communication device includes a display device and wherein upon processing the data, the image exhibited on a display device of a digital frame device is exhibited on the display device of the mobile communication device.

6. The method of claim 1, further comprising:
processing the received data to determine the at least one communication initiation address corresponding to the image exhibited on the display device of the digital frame device where the processing includes a facial recognition algorithm.

7. The method of claim 1, wherein upon processing received data, the method further comprises:
accessing by the mobile communication device ancillary image data corresponding to the data; and
transmitting to the digital frame device, the ancillary image data.

8. The method of claim 7, further comprising:
receiving by the digital frame device the ancillary image data; and
exhibiting by the digital frame device an ancillary image in accordance with the ancillary image data.

9. The method of claim 1, wherein the image exhibited on a display device of the digital frame device is a first image, and wherein the digital frame device is one of a plurality of digital frame devices having display devices, the method further comprising:
sensing proximity of the mobile communication device by at least one of the plurality of digital frame devices subsequent to the mobile communication device initiating the communication signal;
exhibiting on the display device of at least one of the plurality of digital frame devices, an alternative image corresponding to the first image.

10. The method of claim 1 wherein an image includes multiple subjects and wherein receiving data related to an image exhibited on a display device of a digital frame device includes receiving data related to the multiple subjects.

11. A mobile communication device, the mobile communication device being a first device, comprising:
a transceiver configured to receive an image signal from a digital flame device based on the proximity of the mobile communication device to the digital flame device when an image is exhibited on a display device of the digital flame device, the digital flame configured to display multiple images including at least one of a photograph, a photograph in a slideshow format and a video format, the image signal configured to provide data;
a controller in communication with the transceiver, the controller configured to process the data and to initiate retrieval of a communication initiation address accessible by the controller;
wherein receiving data from the digital frame device is in response to at least one of the mobile communication device touching the digital frame device while the display device exhibits the image thereon or to the mobile communication device touching the display device of the digital frame device while the display device exhibits the image thereon.

12. The device of claim 11, further comprising:
a sensor configured to determine proximity of the mobile communication device to the digital frame device.

13. The device of claim 11, wherein the digital frame device comprises:
a sensor configured to determine proximity of the mobile communication device to the digital frame device.

14. The device of claim 11, wherein the data is meta data.

15. The device of claim 11, wherein the communication initiation address is a telephone number.

16. The device of claim 15, further comprising:
a communication signal initiating module configured to initiate a communication signal subsequent to access of the at least one communication initiation address.

17. A mobile communication device, the mobile communication device being a first device, comprising:
a controller configured to execute instructions;
a transceiver in communication with the controller;
a data receiving module configured to receive data related to an image exhibited on a display device of a digital flame device, the digital flame device configured to display multiple images including at least one of a photograph, a photograph in a slideshow format and a video format;
a data processing module configured to process received data so as to access at least one communication initiation address
wherein receiving data from the digital frame device is in response to at least one of the mobile communication device touching the digital frame device while the display device exhibits the image thereon or to the mobile communication device touching the display device of the digital frame device while the display device exhibits the image thereon.

18. The device of claim 17, further comprising:
a prompting module configure to generate a prompt to determine whether to transmit a communication signal pursuant to the at least one communication initiation address.

* * * * *